No. 830,586. PATENTED SEPT. 11, 1906.
A. S. HAMILTON.
COAL CUTTING MACHINE.
APPLICATION FILED AUG. 18, 1905.
2 SHEETS—SHEET 1.
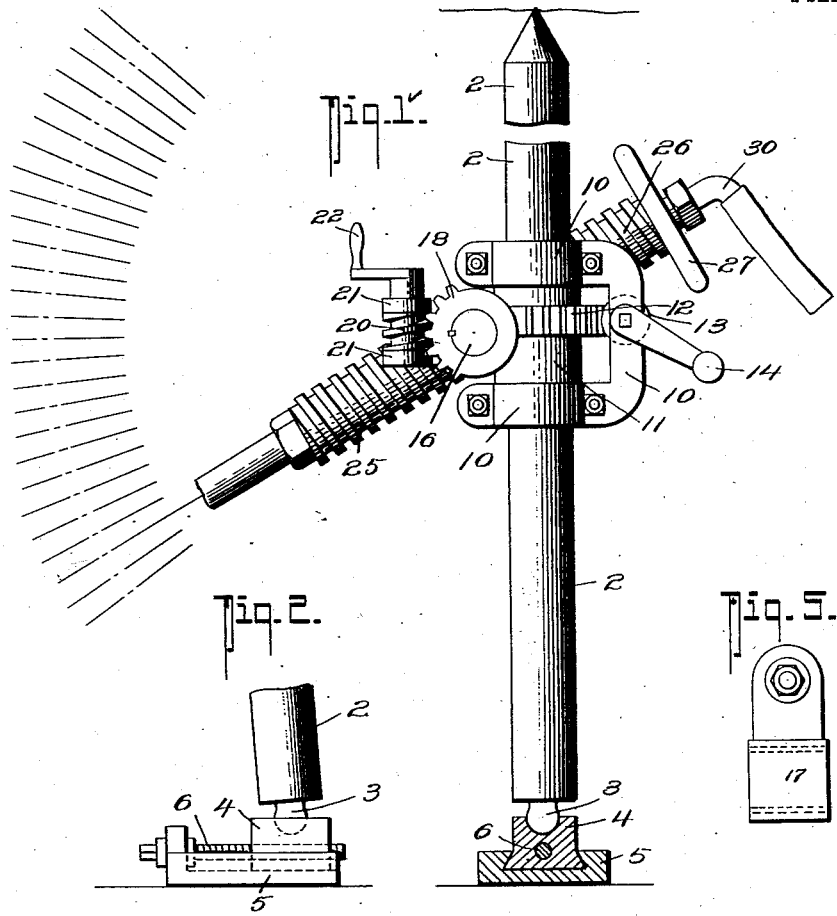
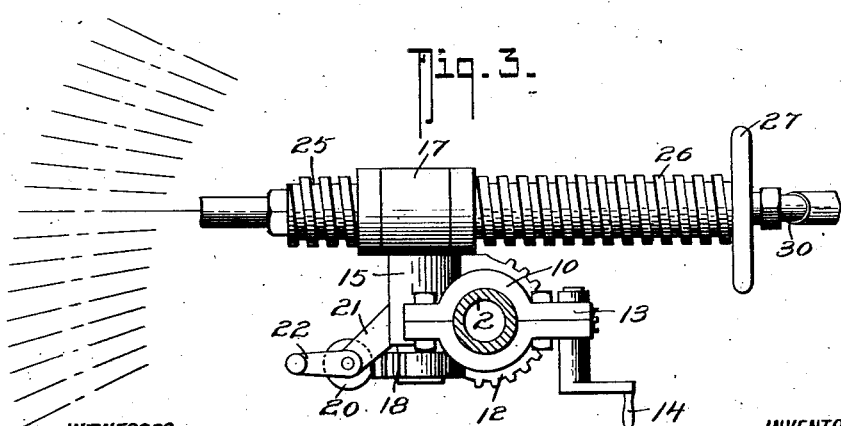
WITNESSES:
F. C. Gibson.
John T. Schrott.
INVENTOR
A. S. Hamilton.
BY
Fred G. Dieterich
ATTORNEY No. 830,586.  PATENTED SEPT. 11, 1906.
A. S. HAMILTON.
COAL CUTTING MACHINE.
APPLICATION FILED AUG. 18, 1905.
2 SHEETS—SHEET 2.
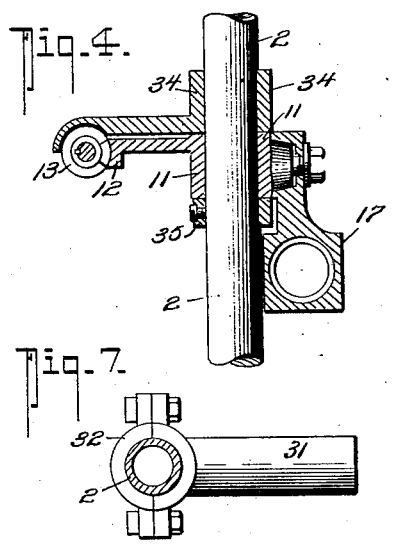
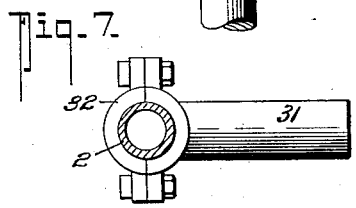
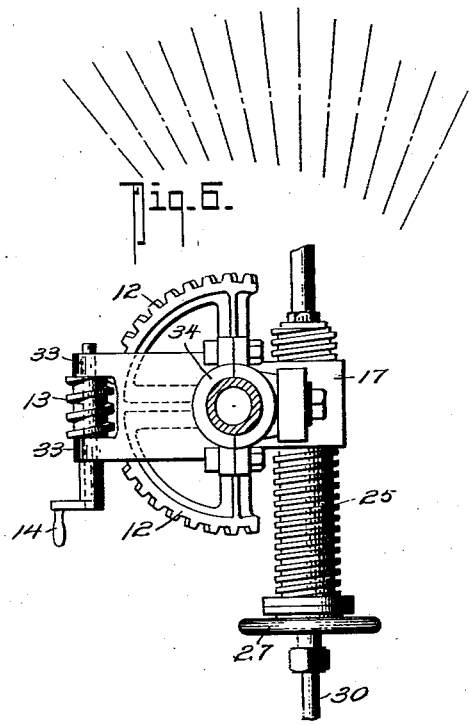
WITNESSES:
INVENTOR
A. S. Hamilton.
BY
ATTORNEY

UNITED STATES PATENT OFFICE.

ABRAM S. HAMILTON, OF NANAIMO, BRITISH COLUMBIA, CANADA.

COAL-CUTTING MACHINE.

No. 830,586.      Specification of Letters Patent.      Patented Sept. 11, 1906.

Application filed August 18, 1905. Serial No. 274,725.

*To all whom it may concern:*

Be it known that I, ABRAM S. HAMILTON, a citizen of the Dominion of Canada, residing at the city of Nanaimo, in the Province of British Columbia, Canada, have invented new and useful Improvements in Coal-Cutting Machines, of which the following is a specification.

My invention relates to the application of a percussive drill to effect the cutting of coal by either undermining or shearing; but although designed particularly for such work it is also applicable to any purpose wherein an effective rock-drill is required having a wide scope and ready mobility.

The machine is of that class wherein the drill-cylinder is moved in radial lines in either horizontal or vertical planes to effect the undercutting or shearing from centers which are adjacent to its support. In machines of this character the advance or feed of the cutting tool or drill is usually attained by mounting the drill-cylinder in a cradle secured to the supporting-column, along which cradle the drill-cylinder is slidably moved by a feed-screw, the desired rotation of the drill in the bore being effected by a rifle-bar and ratchet-wheel. The objections to this design are that the slide along which the drill-cylinder is moved is exposed to a very considerable amount of wear on account of grit and dirt accumulating on it, and the construction of the cradle is such that the axis of the drill-cylinder cannot be brought as close to the supporting-column as is desirable in order to feed the drill strongly to its work on account of the torsional moment which the considerable lateral offset produces. The feed-screw being comparatively small is subjected to rapid wear, as also is the rifle-bar and its connected mechanism by which rotation of the drill is effected.

The object of this invention has been to overcome these faults by providing a feed-screw on the external surface of the drill-cylinder itself, by which means I am enabled to bring the axis of the drill-cylinder as close as practicable to the column by which it is supported, while at the same time I dispense altogether with the independent feed-screw, and as the cylinder itself is rotated to feed the drill forward the desired rotation of the drill is obtained in that rotation without requiring the use of a rifle-bar, &c. I am thus enabled to dispense altogether with the parts that are usually regarded as the weak points of a percussive drill and can bring the axis of the drill-cylinder so close to the column that the torsional movement thereon is not sufficient to prevent the rapid rate of feed being imparted to the drill, while at the same time the working parts are both simpler to manufacture and easier to maintain in good working order.

To enable a screw-thread to be formed on the external surface of the drill-cylinder, I adopt a valve to control the admission and release of the compressed air to and from the cylinder, the axis of which corresponds with that of the cylinder-bore and is automatically operated by the movement of the piston-rod. There are also several other novel features in the construction of the drill to which attention is drawn in the following specification, reference being made to the drawings which accompany it, in which—

Figure 1 shows in elevation the drill mounted to the supporting-column by a mechanism by which a radial movement in either a vertical or a horizontal plane may be imparted to the drill. Fig. 2 shows a side view of the foot-step of the supporting-column. Fig. 3 shows in plan the same manner of drill-mounting as illustrated in Fig. 1. Fig. 4 is a detail of an alternative means for mounting the drill-cylinder to the column direct and gives a radial movement in a horizontal plane; Fig. 5, an elevation of the cylinder-carrying nut; Fig. 6, a plan of the mechanism shown in Fig. 4; Fig. 7, an offset stud or arm which being clamped to the column is adapted to receive the same mechanism as is illustrated in Figs. 4 and 6 and enables a vertical or shear movement of the drill in radial lines.

On referring to Figs. 1, 2, and 3, which illustrate the application of my invention to a mechanism which will provide in one head for radial movement in either a horizontal or vertical plane, 2 represents the column by which the drill-head is supported and which may be furnished with the customary jack-screw for tightening the column between the walls or between floor and roof of the drift or gallery in which it is desired to work. The foot of the column is provided with a spherical end 3, which is stepped into a base-block 4, endwise slidable on the base-plate 5 by means of a screw 6. This provides means for inclining the column to suit the stratification of the vein or drift in which the drill may be required to work. A double clamp member 10 is provided, which may be secured at any desired position on the column 2 by the bolts which clamp the two halves together. Between the two halves of this clamp is mounted so as to be susceptible of rotation on the column or on the same axis a sleeve or bearing 11, having secured to or integral with it a worm-wheel segment 12, into the teeth of which meshes the thread of a worm 13, mounted so as to be rotatable between the two parts of the clamp member 10 by means of a handle 14. On the opposite side of this bearing 11 to the worm-wheel segment and forming one piece with the bearing is a boss 15, the axis of which is at right angles to that of the bearing 11 and is bored to receive a pin or stud 16, projecting from a nut member 17, which forms the drill-cylinder-carrying head designed to carry the drill-cylinder 25. Secured on the pin 16 of the nut member 17 is a worm-wheel segment 18, into the teeth of which meshes the thread of a worm-wheel 20, supported between bearings 21, projecting from the boss 15, and rotatable in these bearings by means of a handle 22. The member 17 is designed to receive a screw-thread cut in the outside surface of the drill-cylinder 25, the end of which drill-cylinder is furnished with a hand-wheel 27, by which the cylinder may be rotated, and thereby moved in or out of the nut and advanced to or withdrawn from its work.

In the alternative design illustrated in Figs. 4, 5, 6, and 7 the drill-cylinder is radially directed by a single rotating mechanism, which may be secured to either the column 2 or to a projecting stud or arm removably secured to the column, according as a horizontal or a vertical movement is required. The supplementary stud or arm is illustrated in Fig. 7 and comprises a cylindrical portion 31, the diameter of which is the same as that of the column 2, to which it may be secured by the divided clamp portion 32. The drill-cylinder-carrying head or nut 17 in this design is secured to the rotatable bearing member 11 in a manner that will allow the nut to be brought close to the column 2 or the projecting arm 31, according as it is secured to either one or the other, and the bearing member 11 is furnished with a worm-wheel segment 12 as before, in the teeth of which meshes the worm 13, rotatable in the bearings 33 by the handle 14. The bearings 33, which support the worm-shaft, form a part of a clamp member 34, by which the device may be secured on either the column 2 or the projecting stud 31, as occasion may require. The rotatable head which carries the drill-cylinder nut is maintained in its position by a collar 35, which may be secured to the column or the stud either by set-screws, as drawn, or by clamping with a bolt and nut. By this construction the rotational mechanism is simplified, and I am enabled, as will be seen in Fig. 4, to bring the axis of the drill-cylinder as as close as practicable to the column or offset stud.

In the operation of the machine the clamp 10 or 34 is secured to either the column 2 or its projecting arm 31, and the support-column being adjusted by means of the base-block 4 to suit the stratification of the coal or rock the drill or cutting tool is swept across the face of the working for undercutting or moved vertically in a similar manner to effect the shearing, while the drill-cylinder is fed forward by the hand-wheel 27, which at the same time effects the rotation of the drill in the drill-hole. The working agent is admitted into the drill through the pipe 30, and the construction of the drill *per se* may be of any approved type, as the same *per se* forms no part of my present invention.

What I claim is—

1. In a machine of the class described, the combination with a supporting-column, of a double clamp member secured to said column, and including a bridge portion, a worm-screw-carrying shaft mounted in said bridge portion, a crank for turning said shaft, a sleeve mounted between the clamp portions of said clamp member, a segmental gear fixedly carried by said sleeve, a bearing member carried by said sleeve with its bearing portion at right angles to the axis of the collar, a drill-cylinder-carrying head having a shaft portion projecting through said last-named bearing member, a segmental gear on said shaft portion, a pair of arms projecting from said sleeve-bearing member, a worm-screw including a shaft mounted between said last-named arms and engaging said segmental gear, a crank for said last-named worm-screw shaft, and a drill held with its cylinder in said carrying-head, substantially as shown and described.

2. In a machine of the class described, the combination with a supporting-column, of a clamp member secured to said column and including a bridge portion, a worm-screw-carrying shaft mounted in said bridge portion, means for turning said shaft, a sleeve mounted on the column in coöperative engagement with the clamp, a segmental gear fixedly carried by said sleeve, a bearing member carried by said sleeve with its bearing portion at right angles to the axis of the collar, a drill-cylinder-carrying head having a portion coöperating with said last-named bearing member, and a drill held with its cylinder in said carrying-head, substantially as shown and described.

In testimony whereof I have signed my name to this specification in the presence of two subscribing witnesses.

A. S. HAMILTON.

Witnesses:
A. B. JOHNSTON,
J. H. SIMPSON.